US009996236B1

(12) United States Patent
Spencer-Harper et al.

(10) Patent No.: US 9,996,236 B1
(45) Date of Patent: Jun. 12, 2018

(54) SIMPLIFIED FRONTEND PROCESSING AND VISUALIZATION OF LARGE DATASETS

(71) Applicant: Palantir Technologies Inc., Palo Alto, CA (US)

(72) Inventors: Quentin Spencer-Harper, London (GB); Alexander Sparrow, Bath (GB); Jose Riarola, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days. days.

(21) Appl. No.: 15/019,844

(22) Filed: Feb. 9, 2016

Related U.S. Application Data

(60) Provisional application No. 62/272,622, filed on Dec. 29, 2015.

(51) Int. Cl.
| G06F 3/048 | (2013.01) |
| G06F 3/0484 | (2013.01) |
| G06F 3/0482 | (2013.01) |
| G06F 17/27 | (2006.01) |
| G06T 11/20 | (2006.01) |
| G06F 17/30 | (2006.01) |

(52) U.S. Cl.
CPC ........ *G06F 3/04845* (2013.01); *G06F 3/0482* (2013.01); *G06F 3/04842* (2013.01); *G06F 17/27* (2013.01); *G06F 17/30572* (2013.01); *G06F 17/30601* (2013.01); *G06T 11/206* (2013.01)

(58) Field of Classification Search
CPC ...................................................... G06F 3/048
See application file for complete search history.

(56) References Cited

U.S. PATENT DOCUMENTS 5,241,624 A * 8/1993 Torres ................... G06F 9/4433
704/8
5,241,625 A 8/1993 Epard et al.
5,845,300 A 12/1998 Comer
(Continued)

FOREIGN PATENT DOCUMENTS

AU 2013251186 11/2015
CN 102054015 5/2014
(Continued)

OTHER PUBLICATIONS

Abbey, Kristen, "Review of Google Docs," May 1, 2007, pp. 2.
(Continued)

*Primary Examiner* — Peiyong Weng
(74) *Attorney, Agent, or Firm* — Schwegman Lundberg & Woessner, P.A.

(57) ABSTRACT

Systems and methods for simplified frontend processing and visualization of large datasets are provided. In example embodiments, a plurality of data objects are accessed. One or more of data objects from among the plurality of data objects are grouped into a first group. A group identifier that identifies data objects included in the first group is created. A visualization comprising a first node that represents the first group is generated. The first node is linked to the group identifier. The visualization is presented on a user interface of the user device. User input indication a user-specified action and the group identifier is received. The user-specified action is performed with the data objects identified by the group identifier.

20 Claims, 13 Drawing Sheets

(56) References Cited

U.S. PATENT DOCUMENTS

| | | | |
|---|---|---|---|
| 5,999,911 A | 12/1999 | Berg et al. | |
| 6,065,026 A | 5/2000 | Cornelia et al. | |
| 6,202,068 B1 * | 3/2001 | Kraay | G06F 17/30554 |
| 6,232,971 B1 | 5/2001 | Haynes | |
| 6,237,138 B1 | 5/2001 | Hameluck et al. | |
| 6,243,706 B1 | 6/2001 | Moreau et al. | |
| 6,370,538 B1 | 4/2002 | Lamping et al. | |
| 6,430,305 B1 | 8/2002 | Decker | |
| 6,523,019 B1 | 2/2003 | Borthwick | |
| 6,665,683 B1 | 12/2003 | Meltzer | |
| 6,850,317 B2 | 2/2005 | Mullins et al. | |
| 6,944,821 B1 | 9/2005 | Bates et al. | |
| 6,967,589 B1 | 11/2005 | Peters | |
| 7,086,028 B1 | 8/2006 | Davis et al. | |
| 7,174,377 B2 | 2/2007 | Bernard et al. | |
| 7,194,680 B1 | 3/2007 | Roy et al. | |
| 7,213,030 B1 | 5/2007 | Jenkins | |
| 7,392,254 B1 | 6/2008 | Jenkins | |
| 7,441,182 B2 | 10/2008 | Beilinson et al. | |
| 7,441,219 B2 | 10/2008 | Perry et al. | |
| 7,765,489 B1 | 7/2010 | Shah et al. | |
| 7,877,421 B2 | 1/2011 | Berger et al. | |
| 7,880,921 B2 | 2/2011 | Dattilo et al. | |
| 7,941,336 B1 | 5/2011 | Robin-Jan | |
| 7,966,199 B1 | 5/2011 | Frasher | |
| 7,958,147 B1 | 6/2011 | Turner et al. | |
| 7,962,495 B2 | 6/2011 | Jain et al. | |
| 8,010,507 B2 | 8/2011 | King et al. | |
| 8,073,857 B2 | 12/2011 | Sreekanth | |
| 8,191,005 B2 | 5/2012 | Baier et al. | |
| 8,290,838 B1 | 10/2012 | Thakur et al. | |
| 8,302,855 B2 | 11/2012 | Ma et al. | |
| 8,527,949 B1 | 9/2013 | Pleis et al. | |
| 8,682,696 B1 | 3/2014 | Shanmugam | |
| 8,688,573 B1 | 4/2014 | Rukonic et al. | |
| 8,732,574 B2 | 5/2014 | Burr et al. | |
| 8,799,313 B2 | 8/2014 | Satlow | |
| 8,807,948 B2 | 8/2014 | Luo et al. | |
| 8,930,874 B2 | 1/2015 | Duff et al. | |
| 8,938,686 B1 | 1/2015 | Erenrich et al. | |
| 8,984,390 B2 | 3/2015 | Aymeloglu et al. | |
| 9,058,315 B2 | 6/2015 | Burr et al. | |
| 9,165,100 B2 | 10/2015 | Begur et al. | |
| 2002/0032677 A1 | 3/2002 | Morgenthaler et al. | |
| 2002/0095360 A1 | 7/2002 | Joao | |
| 2002/0103705 A1 | 8/2002 | Brady | |
| 2002/0196229 A1 | 12/2002 | Chen et al. | |
| 2003/0036927 A1 | 2/2003 | Bowen | |
| 2003/0093755 A1 | 5/2003 | O'Carroll | |
| 2003/0126102 A1 | 7/2003 | Borthwick | |
| 2004/0034570 A1 | 2/2004 | Davis | |
| 2004/0044648 A1 | 3/2004 | Anfindsen et al. | |
| 2004/0205492 A1 | 10/2004 | Newsome | |
| 2004/0236688 A1 | 11/2004 | Bozeman | |
| 2004/0236711 A1 | 11/2004 | Nixon et al. | |
| 2005/0010472 A1 | 1/2005 | Quatse et al. | |
| 2005/0028094 A1 | 2/2005 | Allyn | |
| 2005/0039116 A1 | 2/2005 | Slack-Smith | |
| 2005/0091186 A1 | 4/2005 | Alon | |
| 2005/0125715 A1 | 6/2005 | Di Franco et al. | |
| 2006/0026561 A1 | 2/2006 | Bauman et al. | |
| 2006/0031779 A1 | 2/2006 | Theurer et al. | |
| 2006/0053097 A1 | 3/2006 | King et al. | |
| 2006/0053170 A1 | 3/2006 | Hill et al. | |
| 2006/0059423 A1 | 3/2006 | Lehmann et al. | |
| 2006/0080139 A1 | 4/2006 | Mainzer | |
| 2006/0129746 A1 | 6/2006 | Porter | |
| 2006/0136513 A1 | 6/2006 | Ngo et al. | |
| 2006/0143075 A1 | 6/2006 | Carr et al. | |
| 2006/0155654 A1 | 7/2006 | Plessis et al. | |
| 2006/0178915 A1 | 8/2006 | Chao | |
| 2006/0265417 A1 | 11/2006 | Amato et al. | |
| 2006/0277460 A1 | 12/2006 | Forstall et al. | |
| 2007/0000999 A1 | 1/2007 | Kubo et al. | |
| 2007/0043686 A1 | 2/2007 | Teng et al. | |
| 2007/0061752 A1 | 3/2007 | Cory | |
| 2007/0113164 A1 | 5/2007 | Hansen et al. | |
| 2007/0136095 A1 | 6/2007 | Weinstein | |
| 2007/0168871 A1 | 7/2007 | Jenkins | |
| 2007/0185850 A1 | 8/2007 | Walters et al. | |
| 2007/0245339 A1 | 10/2007 | Bauman et al. | |
| 2007/0284433 A1 | 12/2007 | Domenica et al. | |
| 2007/0299697 A1 | 12/2007 | Friedlander et al. | |
| 2008/0016155 A1 | 1/2008 | Khalatian | |
| 2008/0091693 A1 | 4/2008 | Murthy | |
| 2008/0109714 A1 | 5/2008 | Kumar et al. | |
| 2008/0172607 A1 | 7/2008 | Baer | |
| 2008/0177782 A1 | 7/2008 | Poston et al. | |
| 2008/0186904 A1 | 8/2008 | Koyama et al. | |
| 2008/0249820 A1 | 10/2008 | Pathria et al. | |
| 2008/0313132 A1 | 12/2008 | Hao et al. | |
| 2008/0313243 A1 | 12/2008 | Poston et al. | |
| 2009/0031401 A1 | 1/2009 | Cudich et al. | |
| 2009/0043801 A1 | 2/2009 | LeClair et al. | |
| 2009/0089651 A1 | 4/2009 | Herberger et al. | |
| 2009/0106178 A1 | 4/2009 | Chu | |
| 2009/0112678 A1 | 4/2009 | Luzardo | |
| 2009/0112745 A1 | 4/2009 | Stefanescu | |
| 2009/0150868 A1 | 6/2009 | Chakra et al. | |
| 2009/0177962 A1 | 7/2009 | Gusmorino et al. | |
| 2009/0187546 A1 | 7/2009 | Whyte et al. | |
| 2009/0199106 A1 | 8/2009 | Jonsson et al. | |
| 2009/0248757 A1 | 10/2009 | Havewala et al. | |
| 2009/0249178 A1 | 10/2009 | Ambrosino et al. | |
| 2009/0249244 A1 | 10/2009 | Robinson et al. | |
| 2009/0271343 A1 | 10/2009 | Vaiciulis et al. | |
| 2009/0281839 A1 | 11/2009 | Lynn et al. | |
| 2009/0282068 A1 | 11/2009 | Shockro et al. | |
| 2009/0307049 A1 | 12/2009 | Elliott et al. | |
| 2009/0313463 A1 | 12/2009 | Pang et al. | |
| 2009/0319891 A1 | 12/2009 | MacKinlay et al. | |
| 2010/0057622 A1 | 3/2010 | Faith et al. | |
| 2010/0070844 A1 | 3/2010 | Aymeloglu et al. | |
| 2010/0098318 A1 | 4/2010 | Anderson | |
| 2010/0223260 A1 | 9/2010 | Wu | |
| 2010/0238174 A1 | 9/2010 | Haub et al. | |
| 2010/0262901 A1 | 10/2010 | DiSalvo | |
| 2010/0280851 A1 | 11/2010 | Merkin | |
| 2010/0306722 A1 | 12/2010 | LeHoty et al. | |
| 2010/0313239 A1 | 12/2010 | Chakra et al. | |
| 2011/0047540 A1 | 2/2011 | Williams et al. | |
| 2011/0074788 A1 | 3/2011 | Regan et al. | |
| 2011/0093327 A1 | 4/2011 | Fordyce et al. | |
| 2011/0099133 A1 | 4/2011 | Chang et al. | |
| 2011/0161409 A1 | 6/2011 | Nair et al. | |
| 2011/0173093 A1 | 7/2011 | Psota et al. | |
| 2011/0179048 A1 | 7/2011 | Satlow | |
| 2011/0208565 A1 | 8/2011 | Ross et al. | |
| 2011/0225482 A1 | 9/2011 | Chan et al. | |
| 2012/0004894 A1 | 1/2012 | Butler et al. | |
| 2012/0022945 A1 | 1/2012 | Falkenborg et al. | |
| 2012/0059853 A1 | 3/2012 | Jagota | |
| 2012/0084117 A1 | 4/2012 | Tavares et al. | |
| 2012/0084184 A1 | 4/2012 | Raleigh et al. | |
| 2012/0123989 A1 | 5/2012 | Yu et al. | |
| 2012/0188252 A1 | 7/2012 | Law | |
| 2012/0197657 A1 | 8/2012 | Prodanovich | |
| 2012/0197660 A1 | 8/2012 | Prodanovich | |
| 2012/0215784 A1 | 8/2012 | King et al. | |
| 2012/0221567 A1 * | 8/2012 | Finkelstein | G06F 17/30 707/731 |
| 2012/0226590 A1 | 9/2012 | Love et al. | |
| 2012/0284670 A1 | 11/2012 | Kashik et al. | |
| 2013/0016106 A1 | 1/2013 | Yip et al. | |
| 2013/0151305 A1 | 6/2013 | Akinola et al. | |
| 2013/0151453 A1 | 6/2013 | Bhanot et al. | |
| 2013/0166348 A1 | 6/2013 | Scotto | |
| 2013/0166480 A1 | 6/2013 | Popescu et al. | |
| 2013/0208565 A1 | 10/2013 | Castellanos et al. | |
| 2014/0129936 A1 | 5/2014 | Richards | |
| 2014/0208281 A1 | 7/2014 | Ming | |
| 2014/0222793 A1 | 8/2014 | Sadkin et al. | |
| 2014/0244284 A1 | 8/2014 | Smith | |
| 2014/0358829 A1 | 12/2014 | Hurwitz | |

(56) References Cited

U.S. PATENT DOCUMENTS

| | | | |
|---|---|---|---|
| 2015/0026622 | A1 | 1/2015 | Roaldson et al. |
| 2015/0073954 | A1 | 3/2015 | Braff |
| 2015/0089353 | A1 | 3/2015 | Folkening |
| 2015/0106379 | A1 | 4/2015 | Eliot et al. |
| 2015/0186483 | A1 | 7/2015 | Tappan et al. |
| 2015/0212663 | A1 | 7/2015 | Papale et al. |
| 2015/0254220 | A1 | 9/2015 | Burr et al. |
| 2016/0062555 | A1 | 3/2016 | Ward et al. |

FOREIGN PATENT DOCUMENTS

| | | |
|---|---|---|
| EP | 1672527 | 6/2006 |
| EP | 2993595 | 3/2016 |
| WO | WO 2001/025906 | 4/2001 |
| WO | WO 2001/088750 | 11/2001 |
| WO | WO 2007/133206 | 11/2007 |
| WO | WO 2010/030913 | 3/2010 |
| WO | WO 2010/030914 | 3/2010 |
| WO | WO 2012/119008 | 3/2010 |

OTHER PUBLICATIONS

Adams et al., "Worklets: A Service-Oriented Implementation of Dynamic Flexibility in Workflows," R. Meersman, Z. Tani et al. (Eds.): OTM 2006, LNCS, 4275, pp. 291-308, 2006.
Bluttman et al., "Excel Formulas and Functions for Dummies," 2005, Wiley Publishing, Inc., pp. 280, 284-286.
Chaudhuri et al., "An Overview of Business Intelligence Technology," Communications of the ACM, Aug. 2011, vol. 54, No. 8.
Conner, Nancy, "Google Apps: The Missing Manual," May 1, 2008, pp. 15.
Galliford, Miles, "SnagIt Versus Free Screen Capture Software: Critical Tools for Website Owners," <http://www.subhub.com/articles/free-screen-capture-software>, Mar. 27, 2008, pp. 10.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Kwout, <http://web.archive.org/web/20080905132448/http://www.kwout.com/> Sep. 5, 2008, pp. 2.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Microsoft Windows, "Microsoft Windows Version 2002 Print Out 2," 2002, pp. 1-6.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, <http://oreilly.com/digitalmedia/2006/01/01/mac-os-x-screenshot-secrets.html> published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out 1," Software release date Jun. 15, 2006, pp. 6.
SnagIt, "SnagIt 8.1.0 Print Out 2," Software release date Jun. 15, 2006, pp. 1-3.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Notice of Allowance for U.S. Appl. No. 14/265,637 dated Feb. 13, 2015.
Notice of Allowance for U.S. Appl. No. 14/552,336 dated Nov. 3, 2015.
Notice of Allowance for U.S. Appl. No. 14/676,621 dated Feb. 10, 2016.
Notice of Acceptance for Australian Patent Application No. 2013251186 dated Nov. 6, 2015.
Official Communication for New Zealand Patent Application No. 622473 dated Mar. 27, 2014.
Official Communication for New Zealand Patent Application No. 622473 dated Jun. 19, 2014.
Official Communication for Great Britain Patent Application No. 1404499.4 dated Aug. 20, 2014.
Official Communication for New Zealand Patent Application No. 628161 dated Aug. 25, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Australian Patent Application No. 2013251186 dated Mar. 12, 2015.
Official Communication for Canadian Patent Application No. 2831660 dated Jun. 9, 2015.
Official Communication for Netherlands Patent Application No. 2011729 dated Aug. 13, 2015.
Official Communication for European Patent Application No. 12181585.6 dated Sep. 4, 2015.
Official Communication for Netherlands Patent Application No. 2012438 dated Sep. 21, 2015.
Official Communication for European Patent Application No. 15188106.7 dated Feb. 3, 2016.
Official Communication for European Patent Application No. 15190307.7 dated Feb. 19, 2016.
Official Communication for U.S. Appl. No. 14/571,098 dated Mar. 11, 2015.
Official Communication for U.S. Appl. No. 13/669,274 dated May 6, 2015.
Official Communication for U.S. Appl. No. 13/827,491 dated Jun. 22, 2015.
Official Communication for U.S. Appl. No. 12/556,321 dated Jul. 7, 2015.
Official Communication on U.S. Appl. No. 14/552,336 dated Jul. 20, 2015.
Official Communication for U.S. Appl. No. 14/571,098 dated Aug. 5, 2015.
Official Communication for U.S. Appl. No. 14/571,098 dated Aug. 24, 2015.
Official Communication for U.S. Appl. No. 13/669,274 dated Aug. 26, 2015.
Official Communication for U.S. Appl. No. 13/827,491 dated Oct. 9, 2015.
Official Communication for U.S. Appl. No. 14/571,098 dated Nov. 10, 2015.
Official Communication for U.S. Appl. No. 14/842,734 dated Nov. 19, 2015.
Official Communication for U.S. Appl. No. 14/222,364 dated Dec. 9, 2015.
Official Communication for U.S. Appl. No. 14/800,447 dated Dec. 10, 2015.
Official Communication for U.S. Appl. No. 14/883,498 dated Dec. 24, 2015.
Official Communication for U.S. Appl. No. 14/871,465 dated Feb. 9, 2016.
Official Communication for U.S. Appl. No. 14/741,256 dated Feb. 9, 2016.

(56) References Cited

OTHER PUBLICATIONS

Official Communication for U.S. Appl. No. 14/841,338 dated Feb. 18, 2016.
Official Communication for U.S. Appl. No. 14/715,834 dated Feb. 19, 2016.
Official Communication for U.S. Appl. No. 12/556,321 dated Feb. 25, 2016.
Official Communication for U.S. Appl. No. 14/961,481 dated Mar. 2, 2016.
Official Communication for U.S. Appl. No. 14/883,498 dated Mar. 17, 2016.

* cited by examiner

SIMPLIFIED FRONTEND PROCESSING AND VISUALIZATION OF LARGE DATASETS

RELATED APPLICATIONS

This application claims the priority benefit of U.S. Provisional Application No. 62/272,622, entitled "SIMPLIFIED FRONTEND PROCESSING AND VISUALIZATION OF LARGE DATASETS," filed Dec. 29, 2015, which is incorporated by reference herein in its entirety.

TECHNICAL FIELD

Embodiments of the present disclosure relate generally to graphical visualization and data processing technology and, more particularly, but not by way of limitation, to simplified frontend processing and visualization of large datasets.

BACKGROUND

Processing and visualizing large-scale dataset can present a number of challenges. For instance, generating visualizations with millions of graphical elements may be visually incomprehensible to a user and be of little analytical value. In addition, processing and rendering such a large number of data objects can be computationally expensive. When working with such large-scale datasets, conventional communication schemes between a frontend component and a backend component can overload a communication channel or overload a frontend component with processing.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
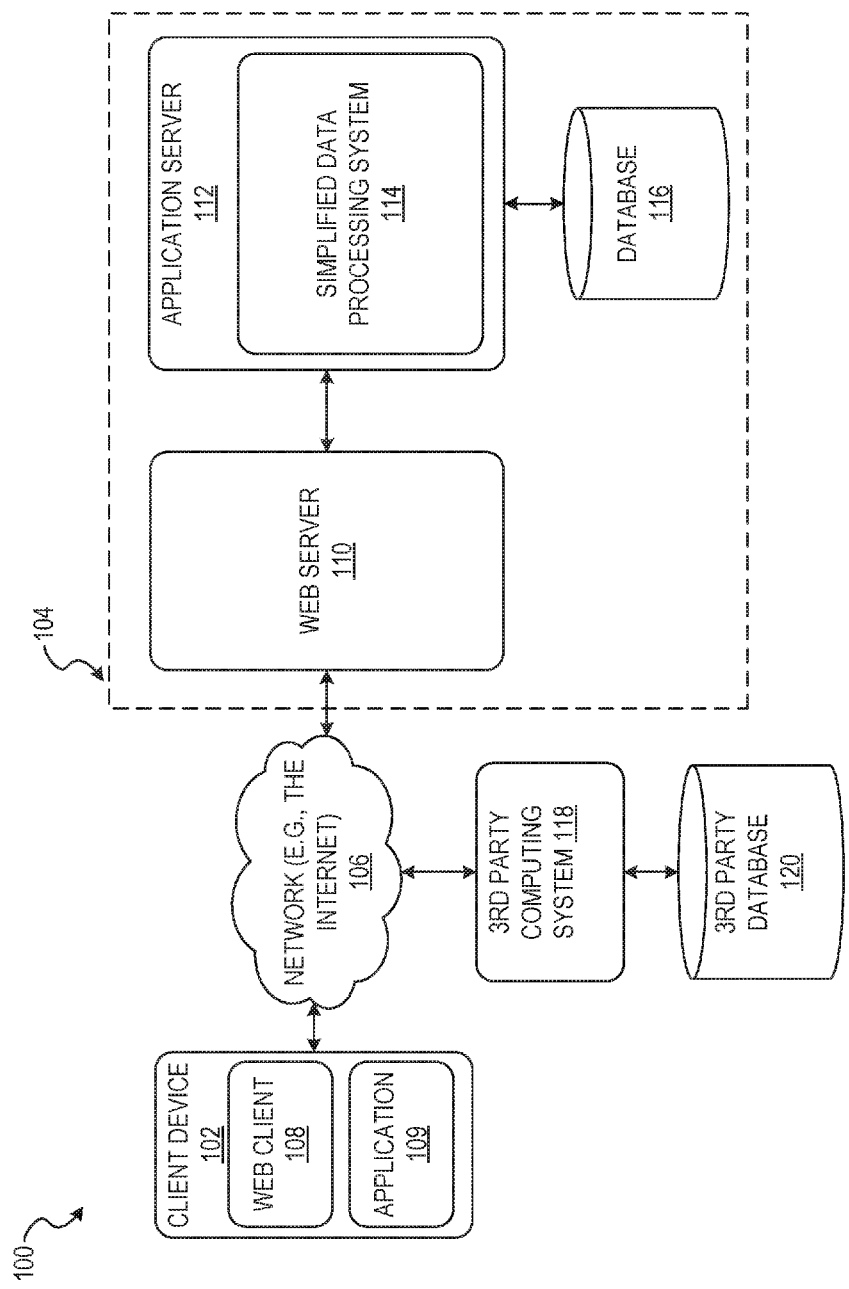
FIG. 1 is an architecture diagram depicting a data processing platform having a client-server architecture configured for exchanging data, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Analyzing large-scale datasets presents a number of user challenges as well as computational challenges. For example, visualization of a large dataset that includes a graph of nodes may not be useful to a user if there are too many nodes in the graph (e.g., thousands or millions of nodes). In addition, rendering such a large number of nodes can consume a large amount of system resources such as memory and processing power.

To provide a useful visualization and to simplify computation demands, in various example embodiments, systems and methods for simplified frontend processing and visualization are provided. In various embodiments, a system is provided that uses lightweight data object representations that represent one or more data objects to reduce memory footprint, conserve communication bandwidth, and reduce processing usage allowing for efficient analysis of large data sets.

In an example embodiment, the system accesses a plurality of data objects. For instance, the data objects can be entries in one or more databases such as bank account databases, phone record databases, geolocation databases, social networking databases, vehicle registration databases, and so forth. Each of the data objects can be associated with an object property. For instance, if the data object is a call entry in a cellular phone record, the object property may indicate a call time, a certain call duration, a telephone number of the caller, a telephone number being called, a cellular tower associated with the call, or another piece of information pertaining to the call entry.

Once the system accesses the plurality of data objects, the system groups the data objects based on object properties. For example, the system forms a particular group that includes call entries associated with a particular cellular tower. In another example, the system forms a particular group that includes bank accounts linked to a particular last name. After the system forms the groupings, the system creates a group identifier for a particular group that identifies the data objects included in the particular group. In various embodiments, the group identifier is a lightweight representation of the data objects include in the group that the system uses to communicate between the backend and frontend. In these embodiments, the system uses the group identifier rather than the data objects included in the group to reduce resources consumed at the frontend when communicating between the frontend and backend.

After the system forms the group and generates the group identifier for the group, the system generates a visualization comprising a node that represents the group and links the node to the group identifier. Put another way, in some embodiments, the visualization comprises a graph of nodes where each node represents a particular group of data objects. In various embodiments, the visualization includes an indication of relationships between the nodes that represent groups of data objects (e.g., a line coupling two nodes to show a hierarchal relationship).

The system causes presentation of the visualization (e.g., transmits instructions to display the visualization on a client device). The system may then receive, from the client device or a frontend component of the system, user input indicating a user-specified action and a user-specified group identifier. Subsequently, the system performs the user-specified action with the data objects identified by the user-specified group identifier. For example, a user requests a particular analysis (e.g., a histogram analysis) of the data objects associated with a particular node in the visualization. By using the group identifier, instead of or in-place of each data object associated with the node, the client device or frontend component of the system can avoid handling the data objects included in a particular group. This can result in a reduction of computational resources consumed by the system when working with such large datasets.

FIG. 1 is an architecture diagram depicting a network system 100 having a client-server architecture configured for exchanging data, according to an example embodiment. While the network system 100 shown in FIG. 1 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

As shown, the network system 100 includes a client device 102 in communication with a data processing platform 104 over a network 106. The data processing platform 104 communicates and exchanges data with the client device 102. The data pertains to various functions and aspects associated with the network system 100 and its users. Likewise, the client device 102, which may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) of the network system 100 to exchange data with the data processing platform 104 over the network 106.

The client device 102 communicates with the network 106 via a wired or wireless connection. For example, one or more portions of the network 106 may comprise an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 102 and the data processing platform 104 involve user-selected functions available through one or more user interfaces (UIs). The UIs may be specifically associated with a web client 108 (e.g., a browser) or an application 109, executing on the client device 102, and in communication with the data processing platform 104.

Turning specifically to the data processing platform 104, a web server 110 is coupled to (e.g., via wired or wireless interfaces), and provides web interfaces to, an application server 112. The application server 112 hosts one or more applications (e.g., web applications) that allow users to use various functions and services of the data processing platform 104. For example, the application server 112 may host a simplified data processing system 114 that is used to generate and present graphical representations of data objects as well as reduce frontend processing when manipulating such graphical representations. In some embodiments, the simplified data processing system 114 runs and executes on the application server 112, while in other embodiments, the application server 112 provides the client device 102 with a set of instructions (e.g., machine-readable code) that causes the web client 108 of the client device 102 to execute and run the simplified data processing system 114.

The simplified data processing system 114 analyzes data objects to generate a visualization comprising a graph of nodes. In an example embodiment, the simplified data processing system 114 automatically groups data objects into a group and creates a group identifier that identifies the data objects included in the group. The simplified data processing system 114 can transmit the group identifier to the frontend or client device 102 and the frontend or client device 102 provides instructions to perform an action associated with the data objects identified by the group identifier. In this way, the frontend or client device 102 does not need to load into memory or handle each data object of the group.

Upon determining a group of data objects, the simplified data processing system 114 generates a graphical representation thereof. The simplified data processing system 114 transmits instructions to the client device 102 that cause the client device 102 to present a user interface for viewing and interacting with the graphical representation including nodes that represent groups of data objects. As an example of the interactions provided by the user interface, users may filter the information displayed according to event category such that only events of a certain category are displayed, by event attributes such that only events with certain attributes are displayed, or by participant attributes such that only participants with certain attributes are included in the represented group.

The data analyzed by the simplified data processing system 114 includes event data that comprises a plurality of event data records. Each event data record includes information about an event. For example, each event data record includes an event identifier (e.g., a name), event attributes (e.g., event category, start time, or end time), and a list of event participant identifiers. The event data is linked to participant data including one or more participant data records. The participant data records include information about event participants. For example, each participant data record includes a participant identifier and participant attributes describing characteristics of event participants. Participant attributes may relate to demographic data, and, accordingly, may include participant gender, age, location information (e.g., hometown or current location), income level, employment history, or education history. Depending on the embodiment, the participant attributes may further include any one of the following: a type of contract or service plan the participant has with a particular company; an effective date of the contract or service plan; an average bill amount; an aggregate amount billed over a particular time period; a credit score; and a type of home (e.g., apartment or single family home).

In example embodiments, data analyzed by the simplified data processing system 114 (e.g., data objects) is obtained from a third-party computing system 118 and in particular, a third-party database 120 communicatively coupled to the third-party computing system 118. The data may be routinely, automatically retrieved (e.g., nightly) by the simplified data processing system 114, or manually provided by a user of the third-party computing system 118 or the client device 102 for subsequent processing and analysis by the simplified data processing system 114.

The data obtained from the third-party computing system 118 is stored in a database 116, which is a machine-readable storage medium that is communicatively coupled to the application server 112 (e.g., via wired or wireless interfaces). The data processing platform 104 may further include a database server (not shown) that facilitates access to the database 116. The database 116 may include multiple databases that may be internal or external to the data processing platform 104.

Figure 2:
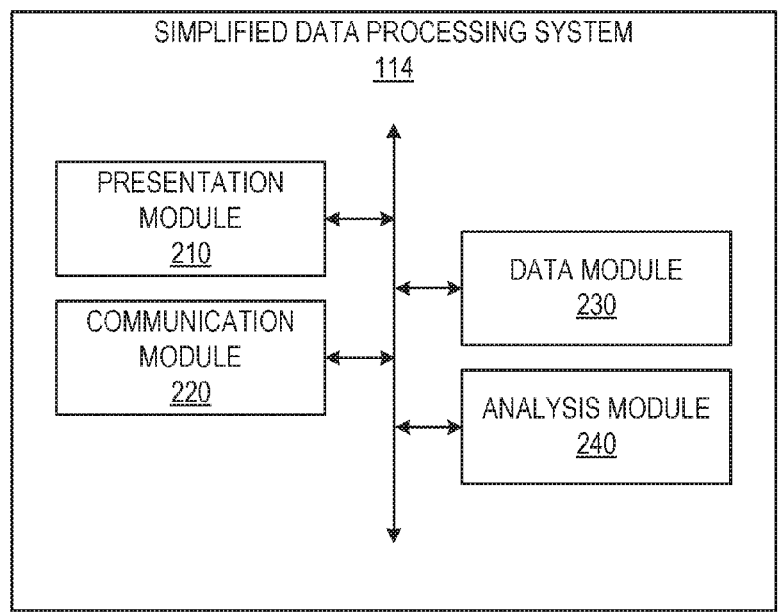
FIG. 2 is a block diagram illustrating an example embodiment of a simplified data processing system, according to some example embodiments.

FIG. 2 is a block diagram of the simplified data processing system 114 that provides functionality for simplifying frontend processing of large datasets. In an example embodiment, the simplified data processing system 114 includes a presentation module 210, a communication module 220, a data module 230, and an analysis module 240. All or some of the modules 210-240 of FIG. 2, communicate with each other, for example, via a network coupling, shared memory, or the like. It will be appreciated that each module can be implemented as a single module, combined into other modules, or further subdivided into multiple modules. Other modules not pertinent to example embodiments can also be included, but are not shown.

In some implementations, the presentation module 210 provides various presentation and user interface functionality operable to interactively present to (or cause presentation) and receive information from the user. For instance, the presentation module 210 generates visualizations such as a graph of nodes showing relationships between nodes. The presentation module 210 also generates user interfaces configured to receive user input such as a selection of an option to perform a particular action with a particular group or set of data objects. In various implementations, the presentation module 210 presents or causes presentation of information (e.g., visually displaying information on a screen, acoustic output, or haptic feedback). Interactively presenting information is intended to include the exchange of information between a particular device and the user. The user may provide input, via the client device 102, to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors). Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the network system 100, the client device 110, and the third party computing system 118. In various example embodiments, the network communication can operate over wired or wireless modalities. Web services are intended to include retrieving information from the third party computing system 118, the database 116, and the application server 112. In some implementations, information retrieved by the communication module 220 comprises data associated with the user (e.g., user profile information from an online account, social network service data associated with the user), data associated with one or more items listed on an e-commerce website (e.g., images of the item, reviews of the item, item price), or other data to facilitate the functionality described herein.

The data module 230 provides functionality to access data objects from a wide variety of data sources. The data module 230 accesses storage repositories, data stores, and databases stored locally, remotely, or a combination thereof. In some embodiments, the data module 230 creates group identifiers that identify a set or group of data objects. In these embodiments, the data module 230 can also find, identify, or otherwise retrieve the data objects included in a group based on the group identifier. For instance, the data module 230 performs a lookup of the data objects included in a particular group using a group identifier for the particular group.

The analysis module 240 provides functionality to analyze object properties of data objects and form groups, perform user-specified actions (e.g., generating a histogram on a particular set of data objects), infer characteristics of data objects or a set of data objects, determine suggested user actions or visualization modifications, and so forth. For example, the analysis module 240 forms various groups of data objects predicated upon like object properties. In a specific example, the analysis module 240 forms a group from data objects comprising cellular telephone call entries associated with a particular cellular tower.

Figure 3:
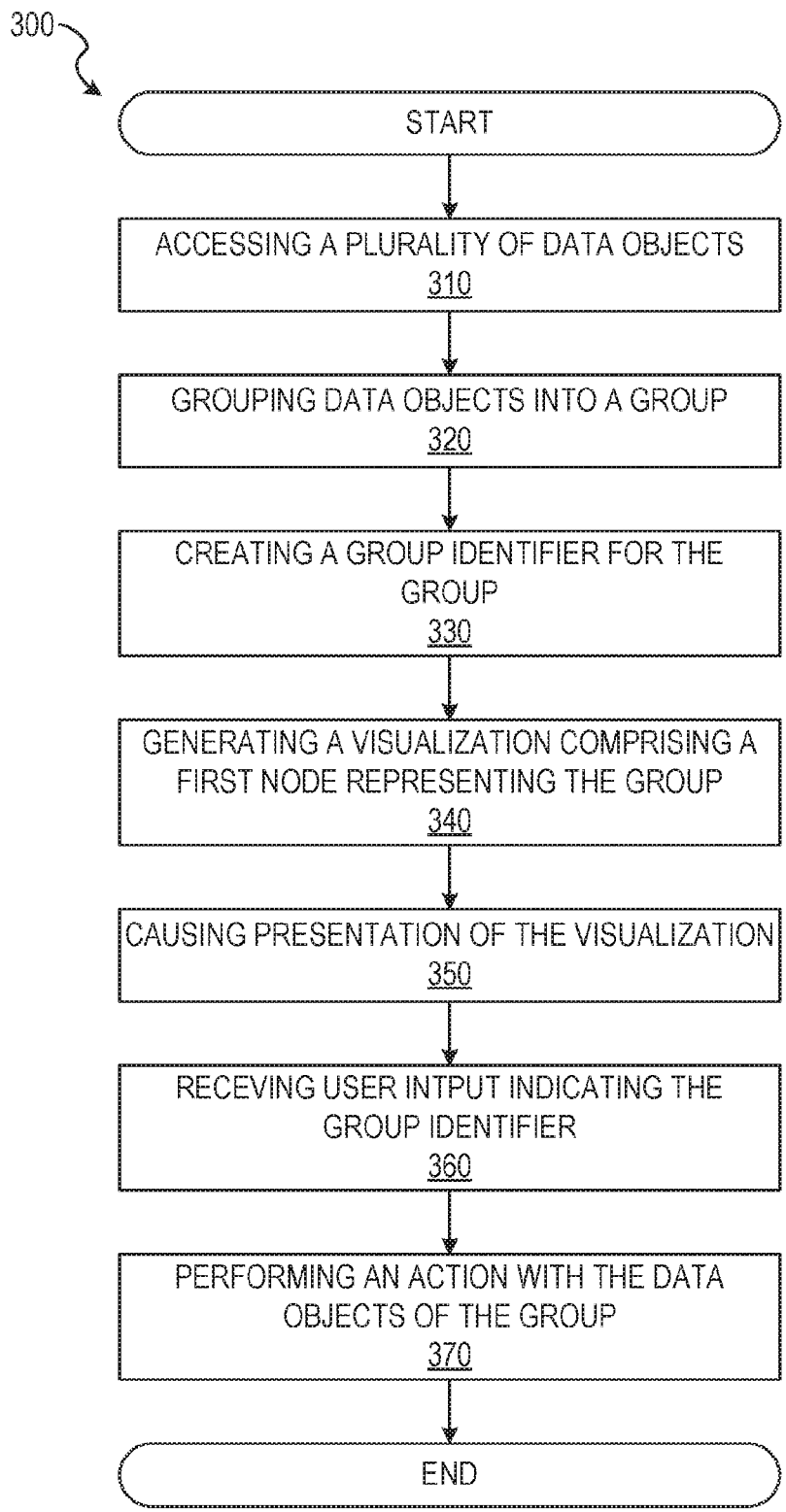
FIG. 3 is a flow diagram illustrating an example method for providing simplified frontend processing for visualizing and manipulating a large dataset, according to some example embodiments.

FIG. 3 is a flow diagram illustrating an example method 300 for providing simplified frontend processing for visualizing and manipulating a large dataset. The operations of the method 300 may be performed by components of the simplified data processing system 114, and are so described below for the purposes of illustration.

At operation 310, the data module 230 accesses a plurality of data objects that are each associated with at least one object property, object attribute, or piece of object data. For example, the user may perform a query for one or more datasets such as finding call entries in cellular call databases associated with a particular geographic location. The data module 230 retrieves the plurality of data objects from one or more databases either stored locally or remotely.

In various example embodiments, the object properties are pieces of data associated with or pertaining to a particular data object. Put another way, the object properties are attributes, features, or characteristics of a particular data object, according to various embodiments. For illustrative purposes, in a specific example, a particular dataset includes data objects corresponding to call entries (e.g., a log of telephone calls). A particular data object corresponding to a particular call includes object properties such as, for example, a time of the particular call, a duration of the particular call, or other information associated with the particular call. Additional details regarding data objects and object properties can be found in U.S. Pat. No. 7,962,495 entitled "CREATING DATA IN A DATA STORE USING A DYNAMIC ONTOLOGY," assigned to the assignee of the instant application, which application is hereby incorporated by reference in its entirety.

At operation 320, the analysis module 240 groups, into a first group, one or more data objects from among the plurality of data objects that are associated with a particular object property. For example, the analysis module 240 identifies data objects in the plurality of data objects associated with a particular object property (e.g., a last name, a cellular phone number, a particular vehicle, or another object property) and groups the identified data objects into the first. In some instance, the analysis module 240 forms groups based on user-specified grouping criteria (e.g., the user specifying a particular attribute, property, or characteristic for the analysis module 240 to use to identify groups). In other instances, the analysis module 240 forms groups automatically (e.g., automatically forming groups based on a predefined or dynamically defined set of rules or conditions such as grouping according to a common last name, a common geographic location, or another commonality between object properties).

At operation 330, the data module 230 creates a group identifier that identifies data objects included in the first group. For example, the group identifier is a code that uniquely identifies data objects included in the first group. In some instances, the data module 230 stores the group identifier in association with the data objects included in the first group to allow for performing a lookup of the data objects included in the first group at a subsequent session. In further embodiments, the data module 230 creates the group identifier along with additional metadata for the first group (e.g., a description of the first group, a data object count for the first group, a data source or sources associate with the first group, or another piece of data pertaining to the first group). In some embodiments, the simplified data processing system 114 transmits the generated metadata along with the group identifier when communicating between the backend and the frontend.

At operation 340, the presentation module 210 generates a visualization comprising a first node that represents the first group, the first node being linked to the group identifier. In some embodiments, the presentation module 210 generates summary information of the first group and includes the summary information in the first node. For instance, the summary information can comprise a count of data objects associated with the node, an average value of the data objects associated with the node, or other pieces of information pertaining to the data objects associated with the node.

At operation 350, the presentation module 210 causes presentation of the visualization on a user interface of a user device of a user. For instance, the presentation module 210 transmits instructions to the user device to display the visualization on a screen of the user device.

At operation 360, the communication module 220 receives user input indicating a user-specified action and the group identifier. For example, the user may select a node and specify an action to be performed with the data objects associated with the node (e.g., filter out data objects in the node that meet a user-specified criteria such as having a particular object property). In an embodiment, the user-specified action comprises a modification of the first group. The modification of the first group can include at least one of a group union, a group intersection, or a group split.

At operation 370, the analysis module 240 performs the user-specified action with the data objects identified by the group identifier. For example, the data module 230 or the analysis module 240 performs a lookup to retrieve the data objects for the one or more group identifiers received and then the analysis module 240 proceeds to perform the user-specified action with the retrieved data objects.

Figure 4:
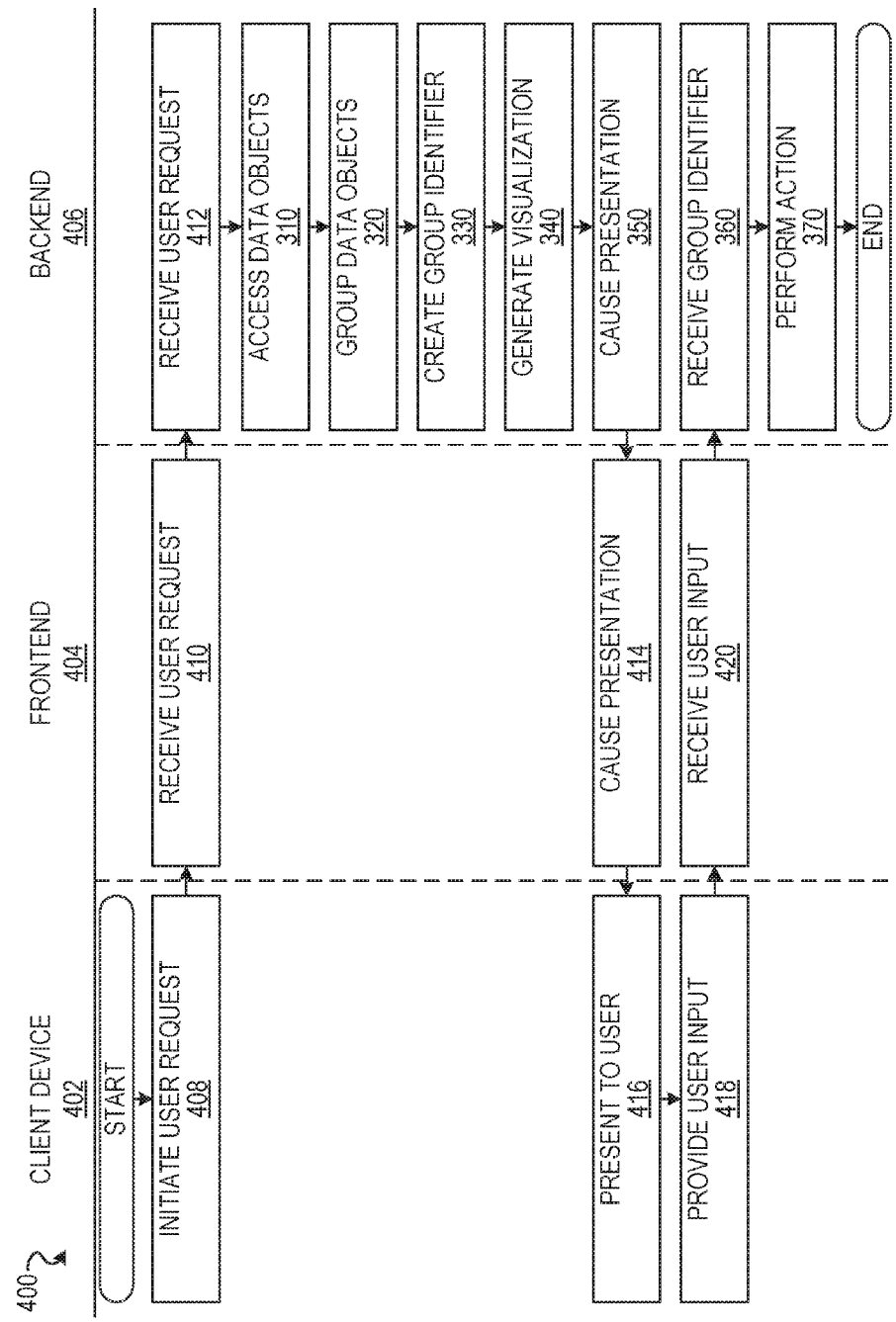
FIG. 4 is a swim-lane diagram illustrating various communications between a client device, frontend, and backend while providing simplified frontend processing, according to some example embodiments.

FIG. 4 is a swim-lane diagram 400 illustrating various communications between a client device, frontend, and backend while providing simplified frontend processing. The diagram 400 shows a client device 402, frontend component 404, and a backend component 406. It will be appreciated that in some embodiments a portion of the frontend component 404 may be part of the client device 402 and in other embodiments, a portion of the frontend component 404 may part of the backend component 406. In example embodiments, the client device 402 is the client device 102.

At operation 408, a user initiates a user request at the client device 402. For instance, the user may be interested in identifying people associated with a particular geolocation at a particular time, and input the request into a user interface configured to receive the request at the client device 402.

At operation 410, the frontend 404 receives the user request. In some embodiments, the frontend 404 is part of the client device 402 and in other embodiments the front end 404 is independent of the client device 402 but communicatively coupled to the client device 402 and the backend 406.

At operation 412, the backend 406 receives the user request from the frontend 404. For example, the backend 406 may be part of a server communicatively coupled to the client device 402. In some instances, a portion of the simplified data processing system 114 resides on the backend 406, the frontend 404, the client device 402, or a combination thereof. Once the backend 406 receives the user request, the simplified data processing system 114 performs the operations 310, 320, 330, 340, and 350 as described above in connection with FIG. 3.

At operation 414, the frontend 404 receives the generated visualization or instructions to generate the visualization from the backend 406. For instance, the backend 406 renders the visualization graphics and transmits the visualization graphics to the frontend.

At operation 416, the client device 402 presents the generated visualization to the user. For instance, the client device 402 displays the visualization on a display screen of the client device 402.

At operation 418, the client device provides user input received from the user to the front end. For example, the user input may indicate a particular action and a group identifier. For instance, if the user activates a particular node included in the visualization that corresponds to a particular group, the client device 402 sends a certain action and the group identifier to the frontend 404 and ultimately the backend 406 for processing. In some instances, the user input can include multiple group identifiers for multiple groups of data objects.

At operation 420, the frontend 404 receives the user input. The frontend 404 communicates the user input to the backend 406. As discussed above, at operation 360, the backend 406 receives the user input and at operation 370 the backend 406 performs the action. The backend 406 may perform a lookup of the data objects associated with the group identifier and then perform the action with the retrieved data objects. In this way, the frontend 404 or the client device 402 uses a lightweight version of the object set and communicates the lightweight version with less computational resources.

Figure 5A:
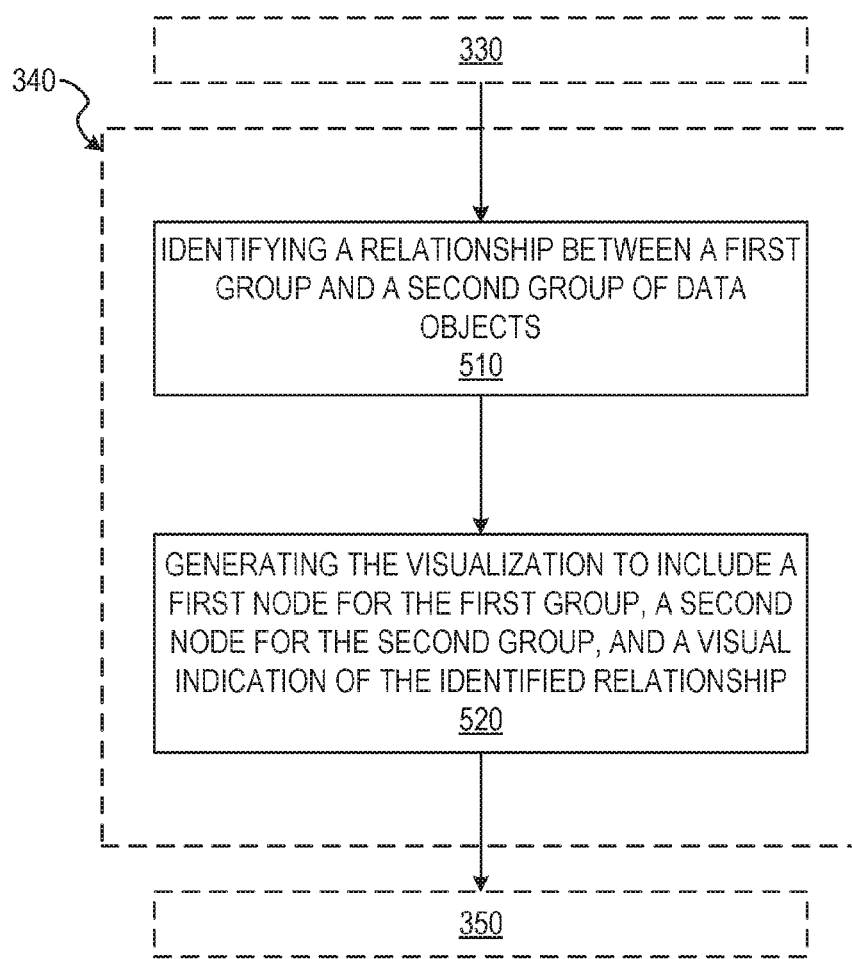
FIG. 5A is a flow diagram illustrating further example operations for generating a visualization of a large dataset, according to some example embodiments.

FIG. 5A is a flow diagram illustrating further example operations for generating a visualization of a large dataset. At operation 340, the presentation module 210 generates the visualization. In some embodiments, the operation 340 includes the additional operations of FIG. 5A, discussed below.

At operation 510, the analysis module 240 identifies a relationship between a first group and a second group of data objects from among the plurality of data objects. In an example embodiment, the identified relationship pertains to aspects of one or more object properties of the first group being common or related to the second group. For instance, if the first group comprises data objects for bank accounts and the second group comprises people, the relationship between the first group and second group can indicate that the people of the second group are associated with the bank accounts of the first group.

In some embodiments, the analysis module 240 generates subsequent groups based on object properties associated with a particular group. In a specific example, the first group comprises call entries where each call entry is associated with object properties indicating a first phone number, a second phone number, and a device identifier. In this example, the analysis module 240 generates, based on the device identifier object property of data objects of the first group, a second group comprising devices (e.g., mobile mobiles or landline phones) that facilitated placing the calls in the first group. The analysis module 240 may then generate another group comprising people associated with the devices of the second group, and so on. Thus, in some embodiments, the analysis module 240 generates a cascade of groups that are related based on object properties.

At operation 520, the presentation module 210 generates the visualization to include a first node for the first group, a second node for the second group, and a visual indication of the identified relationship between the first node and the second node. For example, the visual indication of the identified relationship can comprise a connector (e.g., a line or another visual coupling indication) coupling the first node and the second node on the graph of nodes.

In some example embodiments, the presentation module 210 arranges the first node and the second node in the visualization according to a layout specifying rule for placing nodes within the visualization. For example, the presentation module 210 arranges nodes according to a hierarchy based on relationships between groups represented by the nodes. The presentation module 210 can employ a variety of other layout schemes and techniques.

Figure 5B:
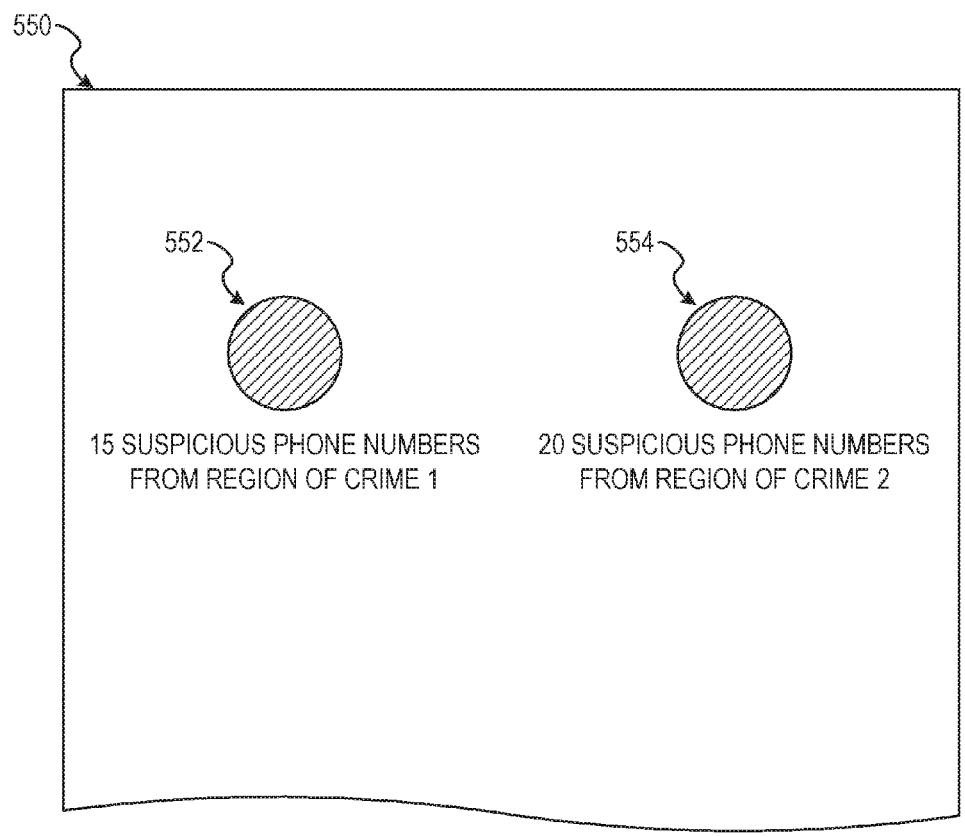
FIGS. 5B, 5C, and 5D are user interface diagrams depicting example visualizations generated as a result of grouping rules and criteria, according to some example embodiments.
Figure 5C:
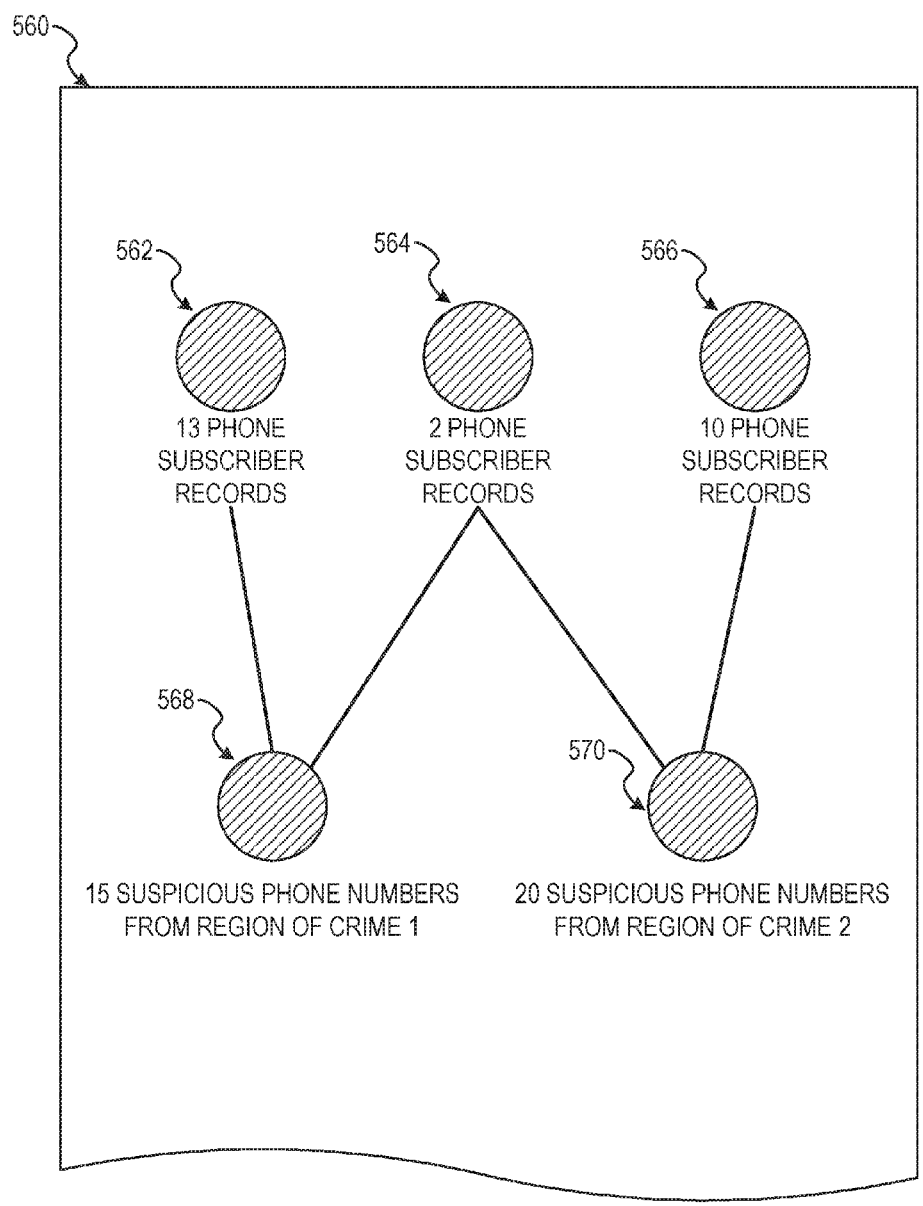
Figure 5D:
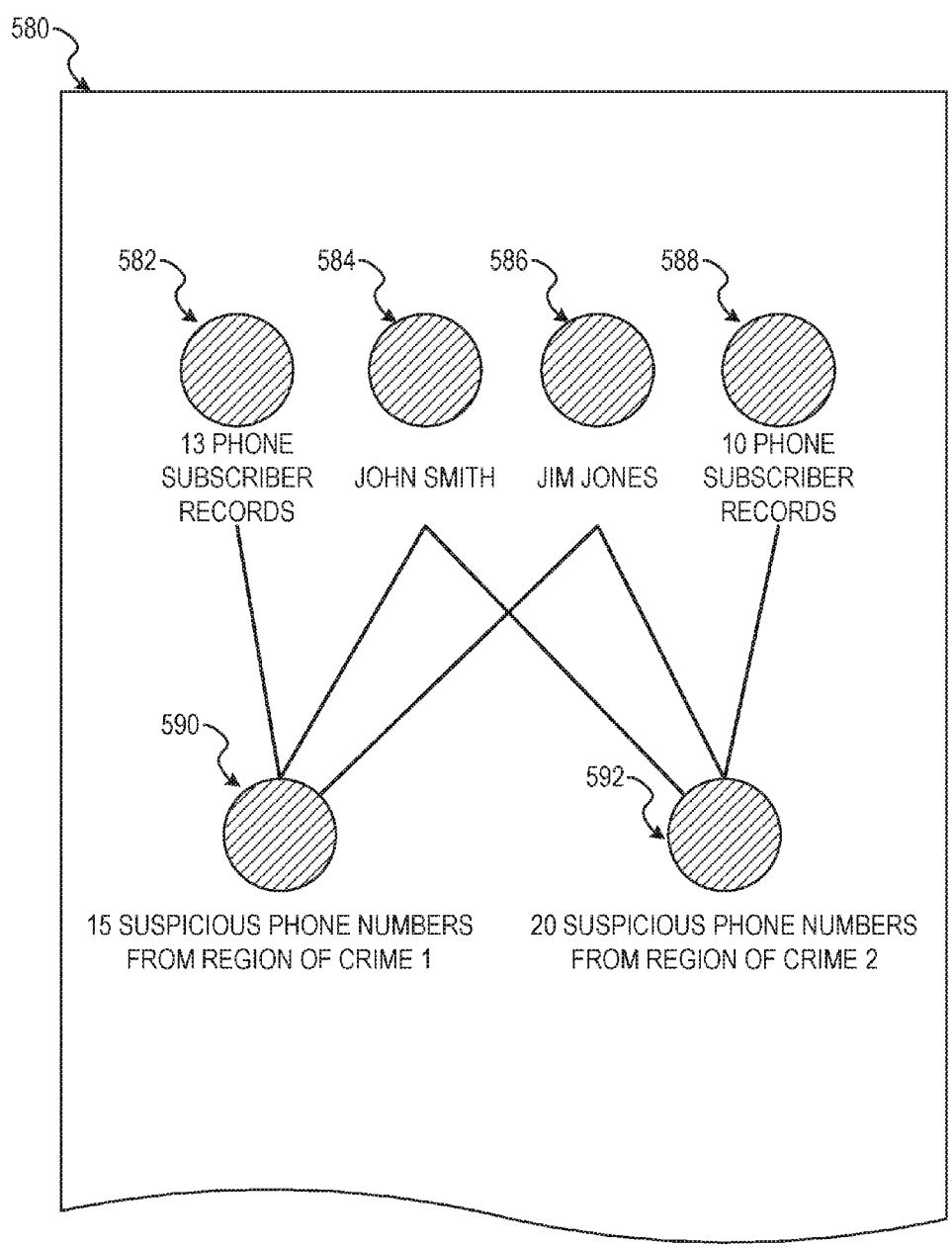

FIGS. 5B, 5C, and 5D are user interface diagrams depicting example visualizations generated as a result of grouping rules and criteria. For example, the presentation module 210 automatically groups data objects and generates nodes that represent the groups. Although several specific example rules are described for automatically grouping, the presentation module 210 may employ many other rules, criteria, and conditions to automatically group data objects.

FIG. 5B is a user interface diagram showing example user interface 550 that includes nodes 552 and 554. In various example embodiments, the presentation module 210 or the analysis module 240 can automatically group data objects according to certain rules, conditions, or criteria and generate a use interface including a layout of nodes representing groups of data objects. For instance presentation module 210 or the analysis module 240 can group data objects based on data objects being linked to the same set of other groups, based on data objecting being of the same object type (e.g., person, location, vehicle, address, etc.), based on a minimum number of objects (e.g., a group is not formed unless there are more than five data objects included in the group), and so forth. In the example of FIG. 5B, the presentation module 210 groups objects linked to exactly the same set of other group nodes. For example, the presentation module 210 groups data objects of the same object type (e.g., person, phone, location, vehicle, address, etc.).

FIG. 5C is a user interface diagram showing example user interface 560 that includes nodes 562, 564, 566, 568, and 570. In the example of FIG. 5C, the simplified data processing system 114 performs a further search for phone subscribers records linked to any of these two groups of phone numbers from FIG. 5B.

FIG. 5D is a user interface diagram showing example user interface 580 that includes nodes 582, 584, 586, 588, 590, and 592. In the example of FIG. 5D, the presentation module 210 uses a minimum group size rule to generate notes to includes in the user interface 580. For instance, since the node 564 represented a group of only two nodes in FIG. 5C, with the minimum group size rule, the presentation module 210 renders a separate node for each data object included in groups with a total data object count less than a minimum group size.

Figure 6:
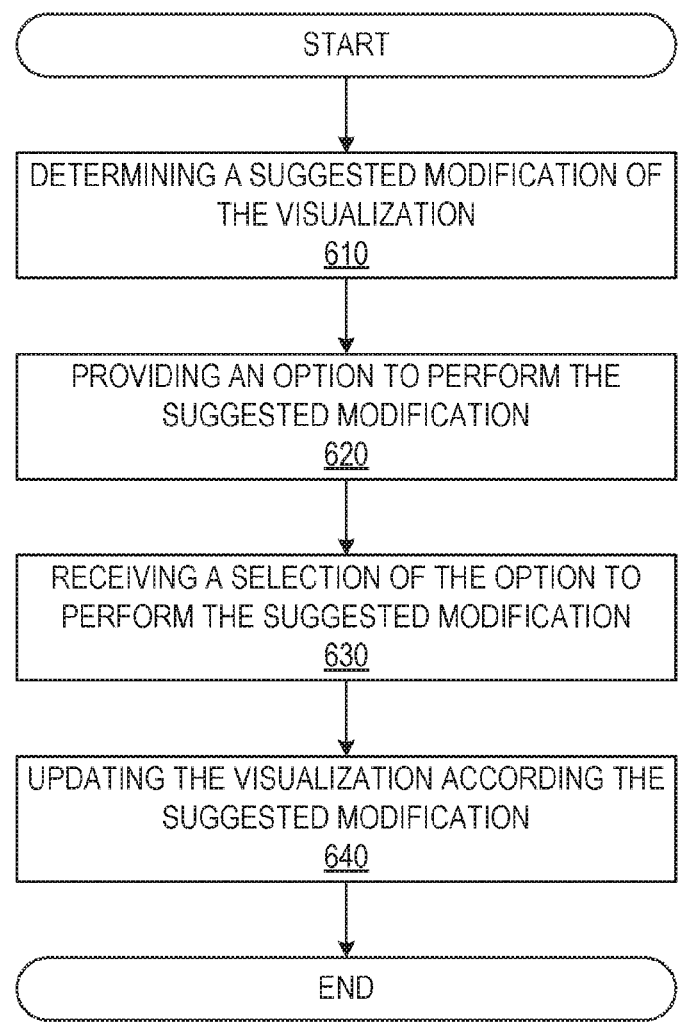
FIG. 6 is a flow diagram illustrating an example method for providing suggested modifications of the visualization to a user, according to some example embodiments.

FIG. 6 is a flow diagram illustrating an example method 600 for providing suggested modifications of the visualization to a user. The operations of the method 600 may be performed by components of the simplified data processing system 114, and are so described below for the purposes of illustration.

At operation 610, the analysis module 240 determines a suggested modification of the visualization. For instance, the analysis module 240 determines a suggested modification of the first group based on an analysis of the data objects included in the first group (e.g., an analysis of the object properties associated with the data objects included in the first group). For example, the analysis module 240 may suggest a split, merge, rearrangement, or another modification of het visualization based on object properties associated with nodes of the visualization (e.g., splitting a node associated with object properties including two distinct commonalties).

At operation 620, the presentation module 210 provides an option to perform the suggested modification. For instance, the presentation module 210 causes display of a user interface that includes an option to select the suggested modification on the client device.

At operation 630, the communication module 220 receives a selection of the option to perform the suggested modification of the first group. As such, the user at the client device selects the option to perform the suggested modification.

At operation 640, the presentation module 210 updates the visualization according to the suggested modification of the first group. The updated visualization is then caused to be displayed on the client device.

Figure 7:
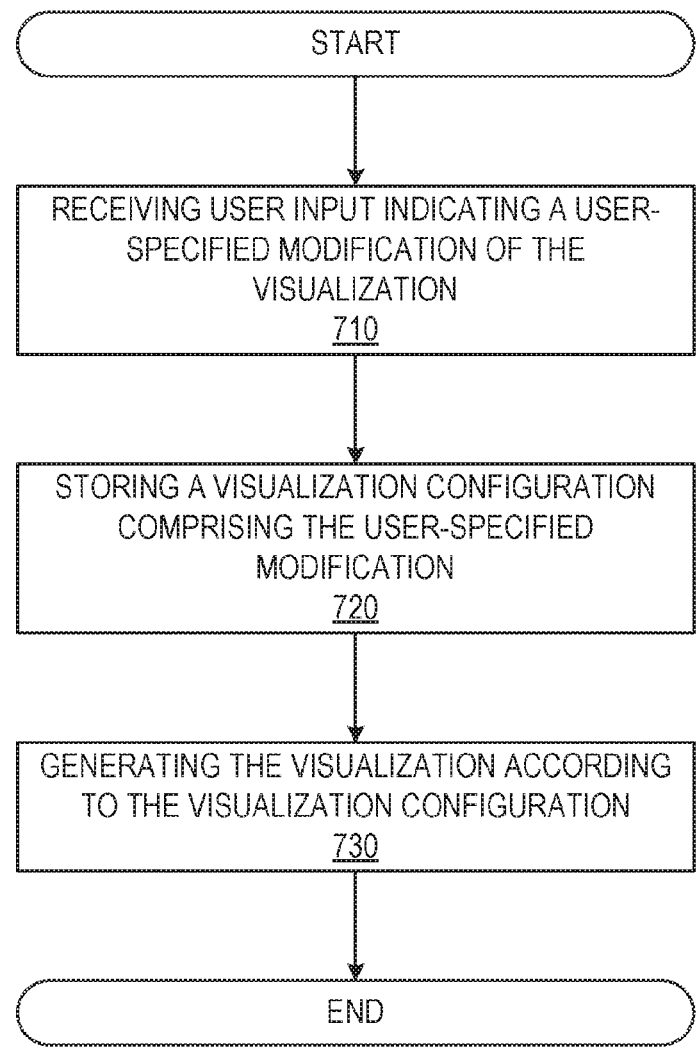
FIG. 7 is a flow diagram illustrating an example method for creating a user-specified configuration for the visualization, according to some example embodiments.

FIG. 7 is a flow diagram illustrating an example method 700 for creating a user-specified configuration for the visualization (visualization configuration). The operations of the method 700 may be performed by components of the simplified data processing system 114, and are so described below for the purposes of illustration.

At operation 710, the communication module 220 receives user input indicating a user-specified modification of the visualization. For instance, the user may perform various node modifications such as splitting, combining, or intersection nodes. In another instance, the user arranges or rearranges nodes in the graph of the visualization. In still another instance, the user filters (e.g., filtering by a particular object property) or otherwise alters the nodes.

At operation 720, the data module 230 stores a visualization configuration comprising the user-specified modification. In some example embodiments, the visualization configuration is used by the presentation module 210 during a later or subsequent session to configure the visualization during or after the presentation module 210 generates the visualization. In these embodiments, the visualization configuration file includes various instructions that may govern or influence the presentation module 210 in generating the visualization. For example, for a first session at a first time, the user modifies the visualization and the data module 230 stores the modifications in the visualization configuration so that the visualization configuration can be employed by the presentation module 210 at a later time by the same user or a different user.

At operation 730, the presentation module 210 generates the visualization according to the visualization configuration. For example, the presentation module 201 accesses the visualization configuration and generates the visualization according to the visualization configuration (e.g., applying filters, arranging nodes on the graph, etc.).

Figure 8:
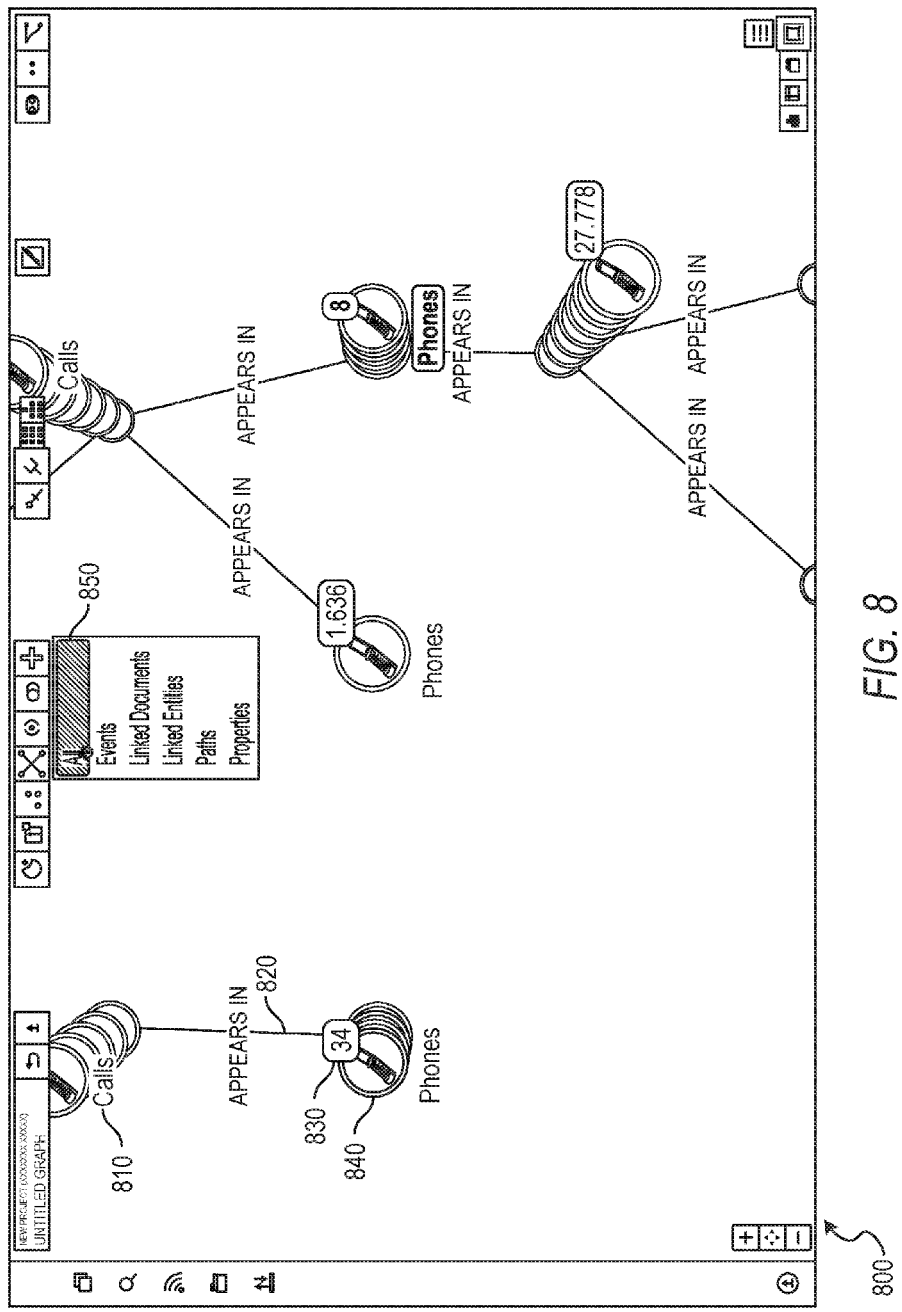
FIGS. 8 and 9 are user interface diagrams depicting various example user interfaces including visualizations of grouped data objects, according to some example embodiments.
Figure 9:
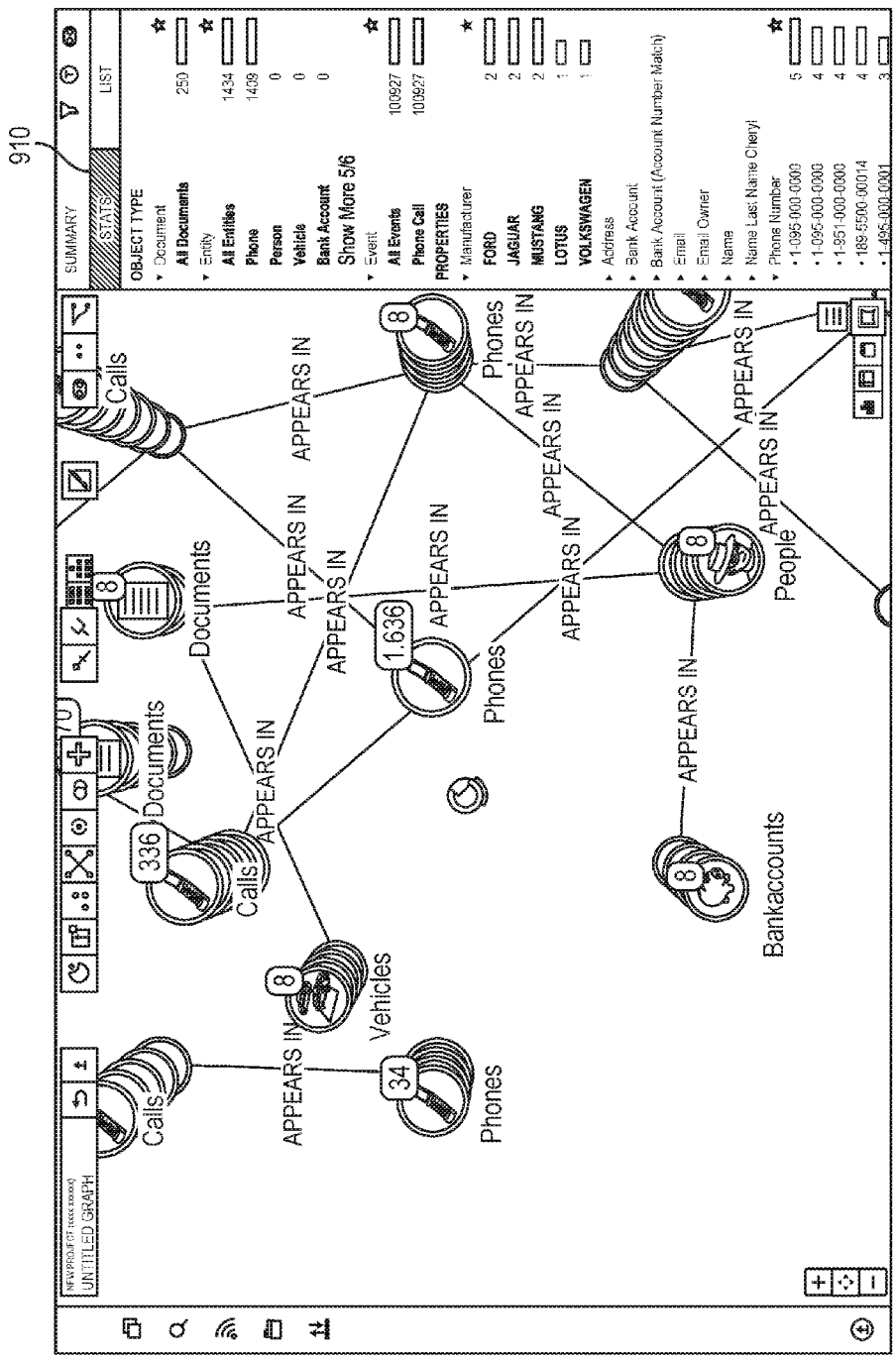

FIGS. 8 and 9 depict example user interfaces for interactively presenting information to the user. Although FIGS. 8 and 9 depict specific example user interfaces and user interface elements, these are merely non-limiting examples; many other alternate user interfaces and user interface elements can be generated by the presentation module 210 and caused to be presented to the user. It will be noted that alternate presentations of the displays of FIGS. 8 and 9 can include additional information, graphics, options, and so forth. Alternatively, other presentations can include less information, or provide abridged information for easy use by the user.

FIG. 8 depicts an example user interface 800 showing nodes corresponding to data object groups. For example, node 810 is a group including a number of call entries from a call database. Node 840 is a group including phone identifiers associated with the call entries of the node 810. Line 820 is a visual indication of the relationship between the node 810 and the node 840. Element 830 shows summary information associated with the node 840. In this example, the element 830 shows that there are 34 phones associated with the call data objects of the node 810. Element 850 shows candidate actions that the user can perform. For example, the user may select one or more of the nodes (e.g., nodes 810 or 840) and perform a particular candidate action shown in the element 850. In this example, a group identifier for a selected node and a candidate action may be communicated to the simplified data processing system 114 and the candidate action performed at the backend of the system rather than at the frontend of the system. The candidate action can include a wide variety of actions such as generating a histogram associated with the data objects included in one or more groups or another type of analysis of the data objects included in one or more groups.

FIG. 9 depicts an example user interface 900 showing nodes corresponding to data object groups and a variety of candidate actions 910 that the user may perform in association with the nodes of the visualization. For example, the candidate actions 910 include performing additional analysis of the data objects included in the nodes (e.g., performing histogram analysis) or modifying nodes by combining nodes, splitting nodes, or intersecting nodes included in the visualization.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-9 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 10:
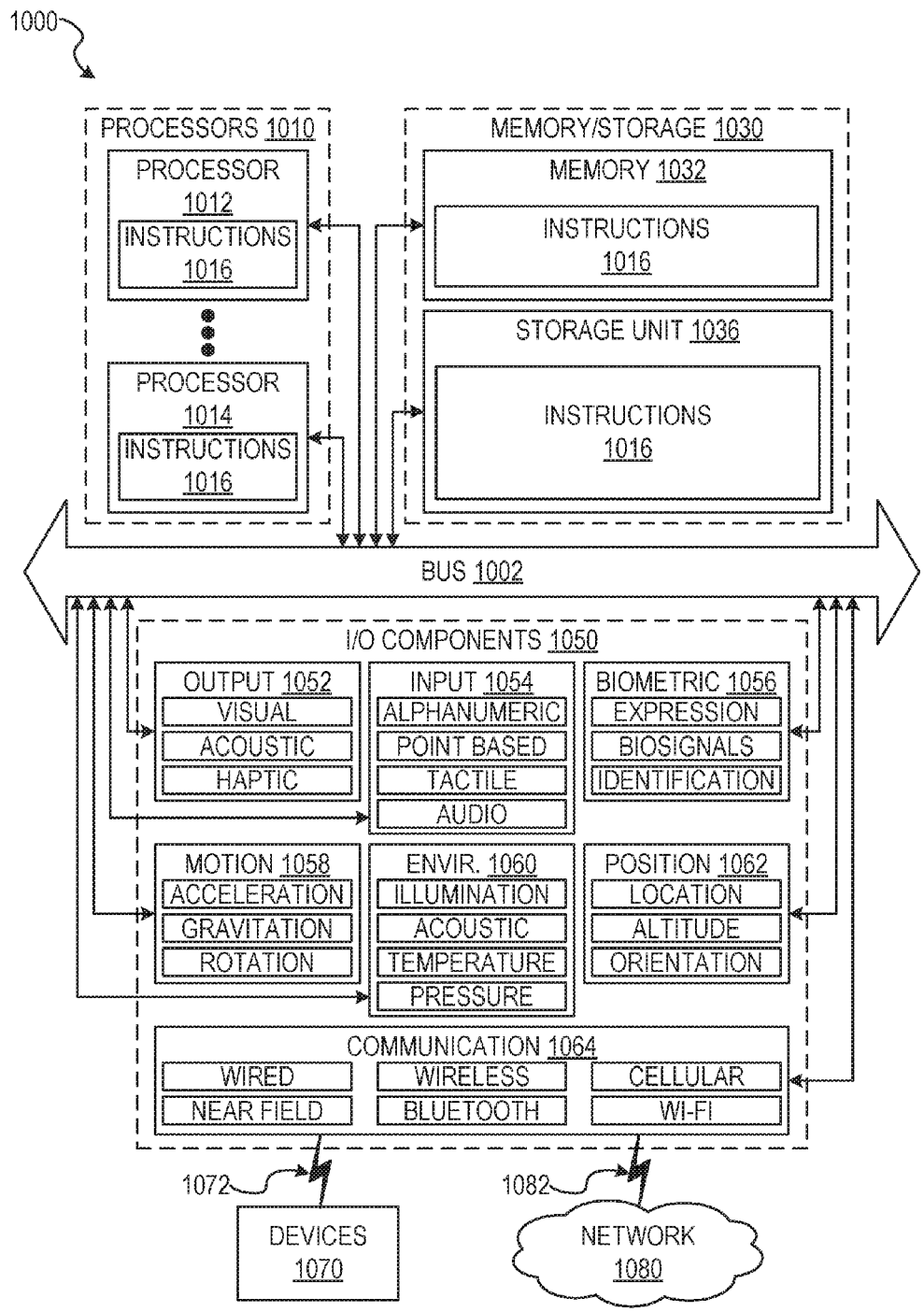
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 can cause the machine 1000 to execute the flow diagrams of FIGS. 3-7. Additionally, or alternatively, the instruction 1016 can implement the presentation module 210, the communication module 220, the data module 230, or the analysis module 240 of FIG. 2, and so forth. The instructions 1016 transform the general, non-programmed machine into a particular machine programmed to carry out the described and illustrated functions in the manner described. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1012 and processor 1014 that may execute instructions 1016. The term "processor" is intended to include multi-core processor that may comprise two or more independent processors (sometimes referred to as "cores") that can execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000.

Accordingly, the memory 1032, the storage unit 1036, and the memory of the processors 1010 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1050 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising: accessing a plurality of data objects that are each associated with at least one object property;
    grouping, into a first group, a plurality of data objects from among the plurality of data objects that are associated with a first object property;
    creating, using a hardware processor of a machine, a group identifier that identifies data objects included in the first group, the group identifier being stored in association with the data objects;
    automatically summarizing, by the hardware processor of the machine, a second object property of the plurality of data objects in the first group to create summary information, the summary information including a summary of the second object property without including the second object property itself, the second object property being different than the first object property;
    generating a visualization comprising a plurality of nodes including a first node that represents the first group, the first node being linked to the group identifier and including the summary information; and
    causing presentation of the visualization on a user interface of a user device of a user.

2. The method of claim 1, further comprising:
    receiving user input indicating a user-specified action relating to the group identifier; and
    performing the user-specified action with the data objects identified by the group identifier.

3. The method of claim 2, wherein the user-specified action comprises a modification of the first group, wherein the modification includes at least one of a group union, a group intersection, or a group split.

4. The method of claim 1, further comprising:
    determining a suggested modification of the first group based on an analysis of the data objects included in the first group;

providing an option to perform the suggested modification of the first group, the option to be displayed on the user interface of the user device;
receiving a selection of the option to perform the suggested modification of the first group; and
updating the visualization according to the suggested modification of the first group.

5. The method of claim 1, further comprising:
receiving user input indicating a user-specified modification to the visualization;
during a first session at a first time, storing a visualization configuration comprising the user-specified modifications; and
during a second session at a second time after the first time, generating the visualization according to the stored visualization configuration.

6. The method of claim 1, further comprising:
identifying a relationship between the first group and a second group of data objects from among the plurality of data objects; and
generating the visualization to include the first node and a second node that represents the second group, wherein the visualization includes a visual indication of the identified relationship between the first node and the second node.

7. The method of claim 6, wherein the first node and the second node are arranged in the visualization according to a layout specifying rule for placing nodes within the visualization.

8. The method of claim 1, further comprising:
generating summary information for the first group, wherein the first node that represents the first group includes a visual indication of the summary information.

9. A system comprising: one or more processors; and a memory storing executable instructions that, when executed by the one or more processors, cause the one or more processors to perform operations comprising:
accessing a plurality of data objects that are each associated with at least one object property;
grouping, into a first group, a plurality of data objects from among the plurality of data objects that are associated with a first object property;
creating, using a hardware processor of a machine, a group identifier that identifies data objects included in the first group, the group identifier being stored in association with the data objects;
summarizing a second object property of the plurality of data objects in the first group to create summary information, the summary information including a summary of the second object property without including the second object property itself, the second object property being different than the first object property;
generating a visualization comprising a plurality of nodes including a first node that represents the first group, the first node being linked to the group identifier, and including the summary information; and
causing presentation of the visualization on a user interface of a user device of a user.

10. The system of claim 9, further comprising:
receiving user input indicating a user-specified action relating to the group identifier; and
performing the user-specified action with the data objects identified by the group identifier.

11. The system of claim 10, wherein the user-specified action comprises a modification of the first group, wherein the modification includes at least one of a group union, a group intersection, or a group split.

12. The system of claim 9, wherein:
determining a suggested modification of the first group based on an analysis of the data objects included in the first group;
providing an option to perform the suggested modification of the first group, the option to be displayed on the user interface of the user device;
receiving a selection of the option to perform the suggested modification of the first group; and
updating the visualization according to the suggested modification of the first group.

13. A machine-readable medium having no transitory signals and storing instructions that, when executed by at least one processor of a machine, cause the machine to perform operations comprising:
accessing a plurality of data objects that are each associated with at least one object property;
grouping, into a first group, a plurality of data objects from among the plurality of data objects that are associated with a first object property;
creating, using a hardware processor of a machine, a group identifier that identifies data objects included in the first group, the group identifier being stored in association with the data objects;
summarizing a second object property of the plurality of data objects in the first group to create summary information, the summary information including a summary of the second object property without including the second object property itself, the second object property being different than the first object property;
generating a visualization comprising a plurality of nodes including a first node that represents the first group, the first node being linked to the group identifier, and including the summary information; and
causing presentation of the visualization on a user interface of a user device of a user.

14. The machine-readable medium of claim 13, wherein the operations further comprise:
receiving user input indicating a user-specified action relating to the group identifier; and
performing the user-specified action with the data objects identified by the group identifier.

15. The machine-readable medium of claim 14, wherein the user-specified action comprises a modification of the first group, wherein the modification includes at least one of a group union, a group intersection, or a group split.

16. The machine-readable medium of claim 13, wherein the operations further comprise:
determining a suggested modification of the first group based on an analysis of the data objects included in the first group;
providing an option to perform the suggested modification of the first group, the option to be displayed on the user interface of the user device;
receiving a selection of the option to perform the suggested modification of the first group; and
updating the visualization according to the suggested modification of the first group.

17. The machine-readable medium of claim 13, wherein the operations further comprise:
receiving user input indicating a user-specified modification to the visualization;
during a first session at a first time, storing a visualization configuration comprising the user-specified modifications; and during a second session at a second time after the first time, generating the visualization according to the stored visualization configuration.

18. The machine-readable medium of claim 13, wherein the operations further comprise:
   identifying a relationship between the first group and a second group of data objects from among the plurality of data objects; and
   generating the visualization to include the first node and a second node that represents the second group, wherein the visualization includes a visual indication of the identified relationship between the first node and the second node.

19. The machine-readable medium of claim 18, wherein the first node and the second node are arranged in the visualization according to a layout specifying rule for placing nodes within the visualization.

20. The machine-readable medium of claim 13, wherein the operations further comprise:
   generating summary information for the first group, wherein the first node that represents the first group includes a visual indication of the summary information.

* * * * *